US00RE47961E

(19) United States
(12) Reissued Patent
Pedersen

(10) Patent Number: US RE47,961 E
(45) Date of Reissued Patent: Apr. 28, 2020

(54) LOUNGE CHAIR

(71) Applicant: Gloster Furniture Limited, Bristol (GB)

(72) Inventor: Henrik Pedersen, Aarhus C (DK)

(73) Assignee: Gloster Furniture Limited, Bristol (GB)

(21) Appl. No.: 29/698,365

(22) Filed: Jul. 16, 2019

Related U.S. Patent Documents

Reissue of:
(64) Patent No.: Des. 792,121
Issued: Jul. 18, 2017
Appl. No.: 29/505,790
Filed: Feb. 10, 2016

(51) LOC (12) Cl. ..... 06-01
(52) U.S. Cl.
USPC ..... D6/379; D6/381
(58) Field of Classification Search
USPC ..... D6/334, 335, 360, 367, 368, 371–375
(Continued)

(56) References Cited

U.S. PATENT DOCUMENTS

D133,849 S * 9/1942 Brodovitch ..... D6/375
D155,023 S * 8/1949 Michals ..... D6/334
(Continued)

*Primary Examiner* — Philip S Hyder
(74) *Attorney, Agent, or Firm* — Ladas & Parry LLP

(57) CLAIM

The ornamental design for a lounge chair, as shown.

DESCRIPTION

FIG. 1 is a top right front perspective view of a preferred embodiment of the lounge chair showing my new design;
FIG. 2 is a bottom rear perspective thereof;
FIG. 3 is a front plan view thereof;
FIG. 4 is a rear plan view thereof;
FIG. 5 is a top elevation thereof;
FIG. 6 is a bottom elevation thereof;
FIG. 7 is a right side elevation thereof; [and]
FIG. 8 is a left side elevation thereof[.];
FIG. 9 is a top right front perspective view of a double seat embodiment of the lounge chair showing my new design;
FIG. 10 is a bottom rear perspective of the double seat embodiment;
FIG. 11 is a front plan view of the double seat embodiment;
FIG. 12 is a rear plan view of the double seat embodiment;
FIG. 13 is a top elevation of the double seat embodiment;
FIG. 14 is bottom elevation of the double seat embodiment;
FIG. 15 is a right side elevation of the double seat embodiment; [and]
FIG. 16 is a left side elevation of the double seat embodiment;
FIG. 17 is a top right front perspective view of a triple seat embodiment of the lounge chair showing my new design;
FIG. 18 is a bottom rear perspective of the triple seat embodiment;
FIG. 19 is a front plan view of the triple seat embodiment;
FIG. 20 is a rear plan view of the double seat embodiment;
FIG. 21 is top elevation of the triple seat embodiment;
FIG. 22 is a bottom elevation of the triple seat embodiment;
FIG. 23 is a right side elevation of the triple seat embodiment; [and,]
FIG. 24 is a left side elevation of the triple seat embodiment[.];
*FIG. 25 is a top right front perspective view of a variant of the first embodiment of the lounge chair showing my new design;*
*FIG. 26 is a bottom rear perspective thereof;*
*FIG. 27 is a front plan view thereof;*
*FIG. 28 is a rear plan view thereof;*
*FIG. 29 is a top elevation thereof;*
*FIG. 30 is a bottom elevation thereof;*
*FIG. 31 is a right side elevation thereof;*
*FIG. 32 is a left side elevation thereof;*
*FIG. 33 is a top right front perspective view of a variant of the second embodiment of the lounge chair showing my new design;*
*FIG. 34 is a bottom rear perspective thereof;*
*FIG. 35 is a front plan view thereof;*
*FIG. 36 is a rear plan view thereof;*
*FIG. 37 is a top elevation thereof;*
(Continued)

*FIG. 38 is bottom elevation thereof;*
*FIG. 39 is a right side elevation thereof;*
*FIG. 40 is a left side elevation thereof;*
*FIG. 41 is a top right front perspective view of a variant of the third embodiment of the lounge chair showing my new design;*
*FIG. 42 is a bottom rear perspective thereof;*
*FIG. 43 is a front plan view thereof;*
*FIG. 44 is a rear plan view thereof;*
*FIG. 45 is top elevation thereof;*
*FIG. 46 is a bottom elevation thereof;*
*FIG. 47 is a right side elevation thereof; and,*
*FIG. 48 is a left side elevation thereof.*
*The broken lines shown in the drawings illustrate portions of the lounge chair that form no part of the claimed design.*

1 Claim, 32 Drawing Sheets

Figure 2:
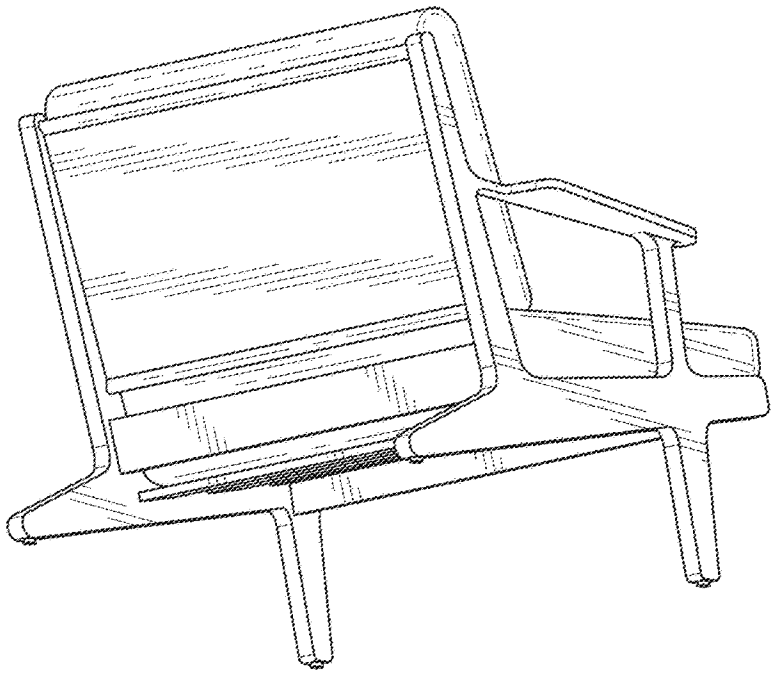
Figure 1:
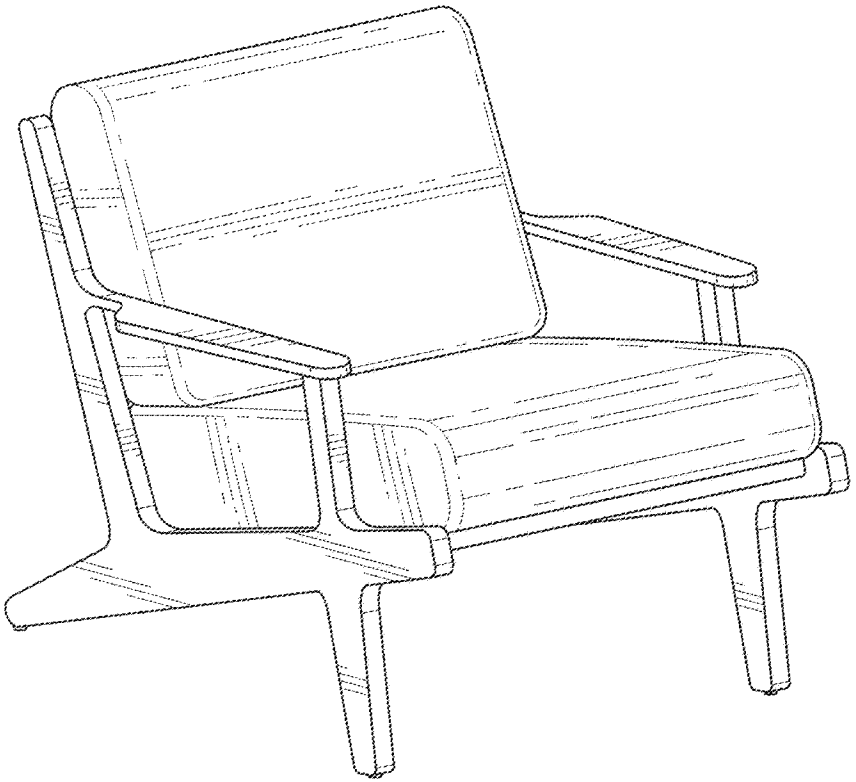
Figure 4:
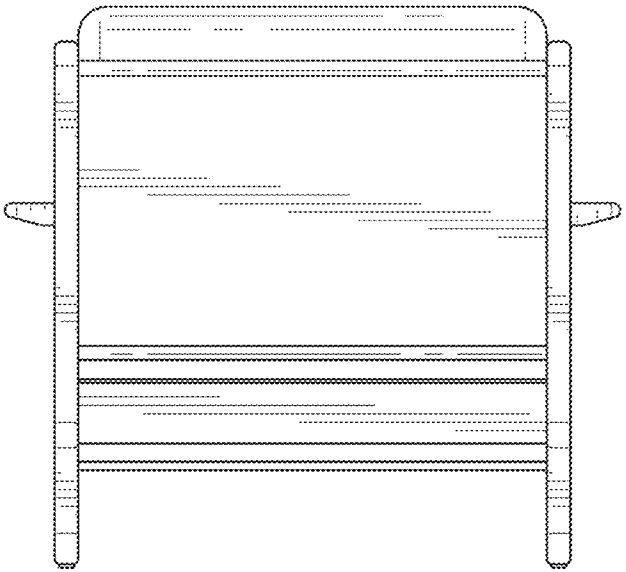
Figure 3:
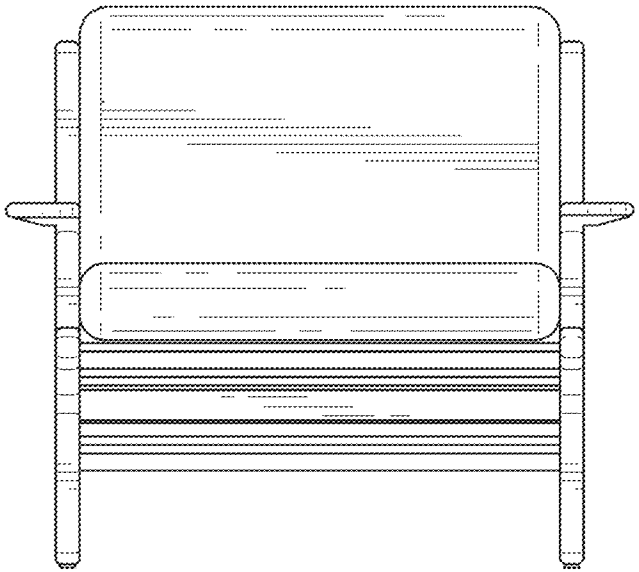
Figure 6:
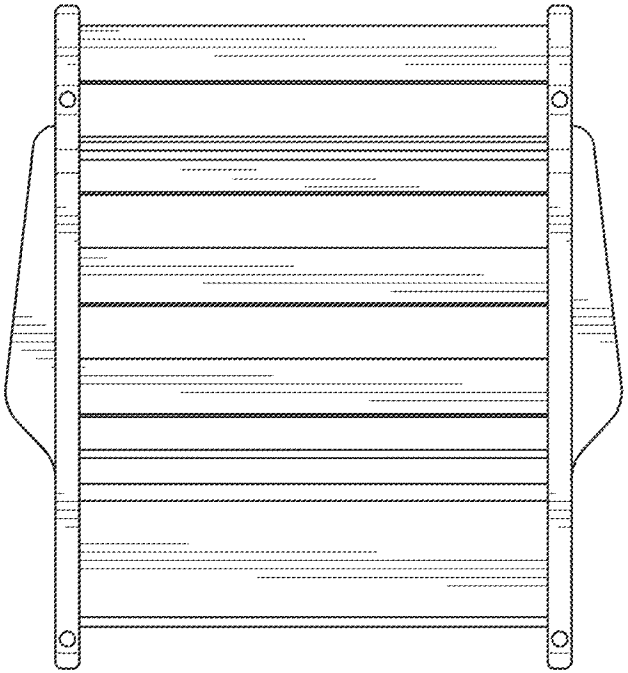
Figure 5:
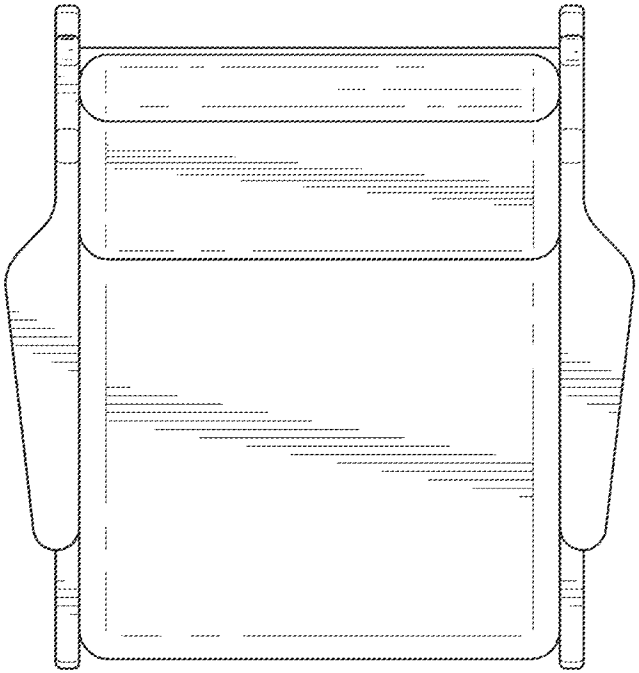
Figure 8:
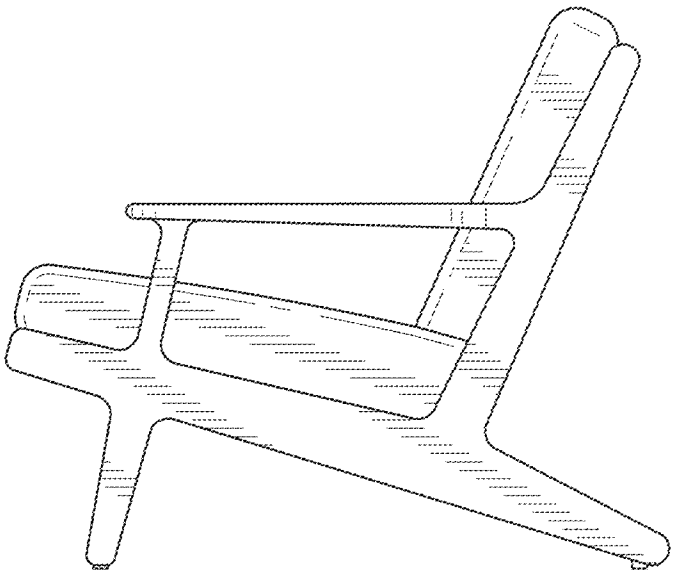
Figure 7:
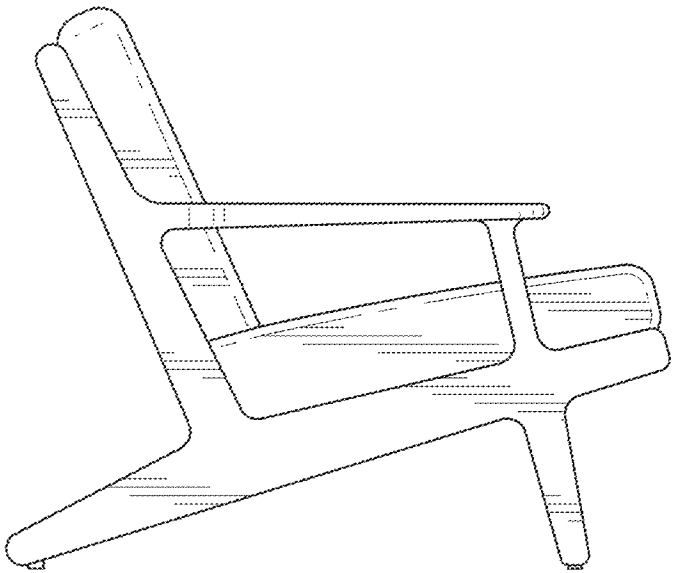
Figure 9:
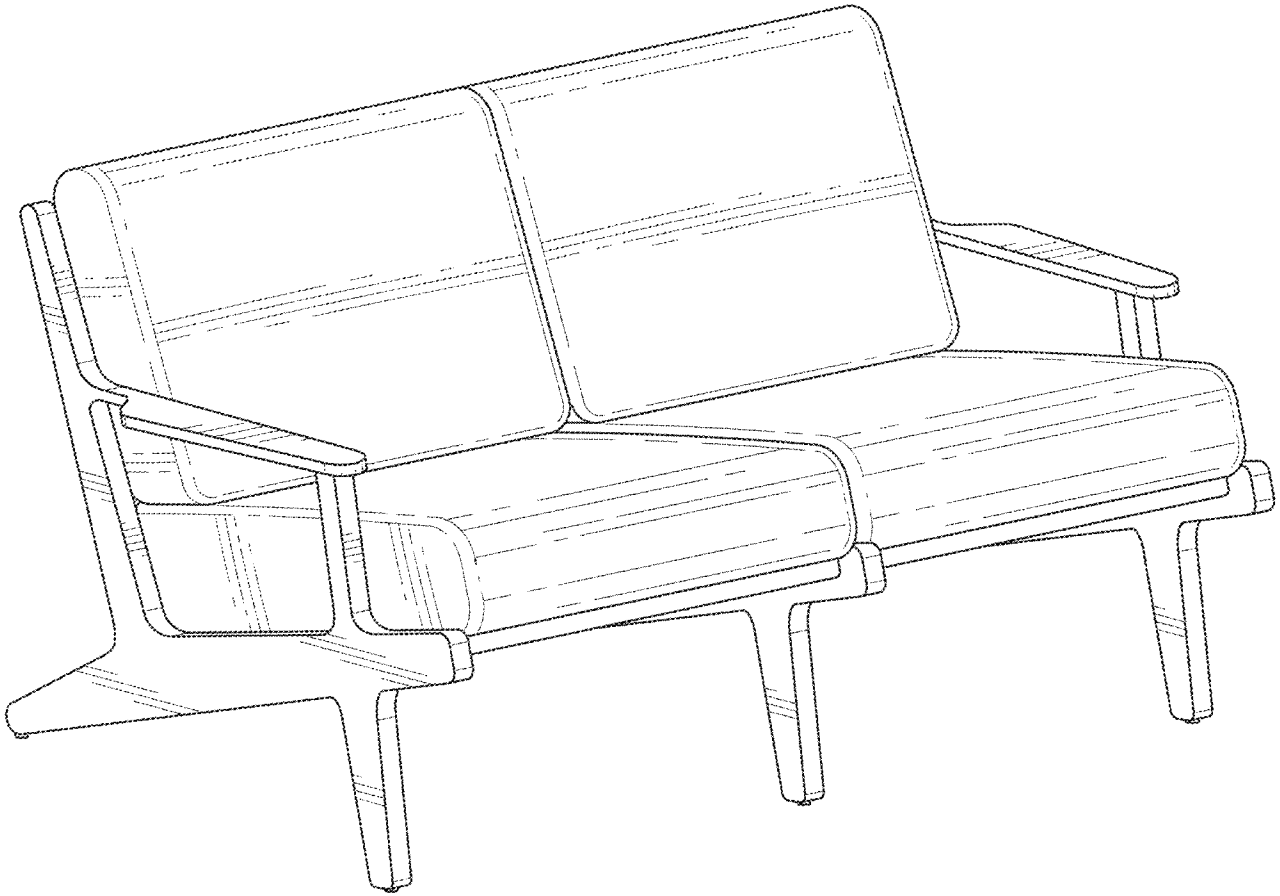
Figure 10:
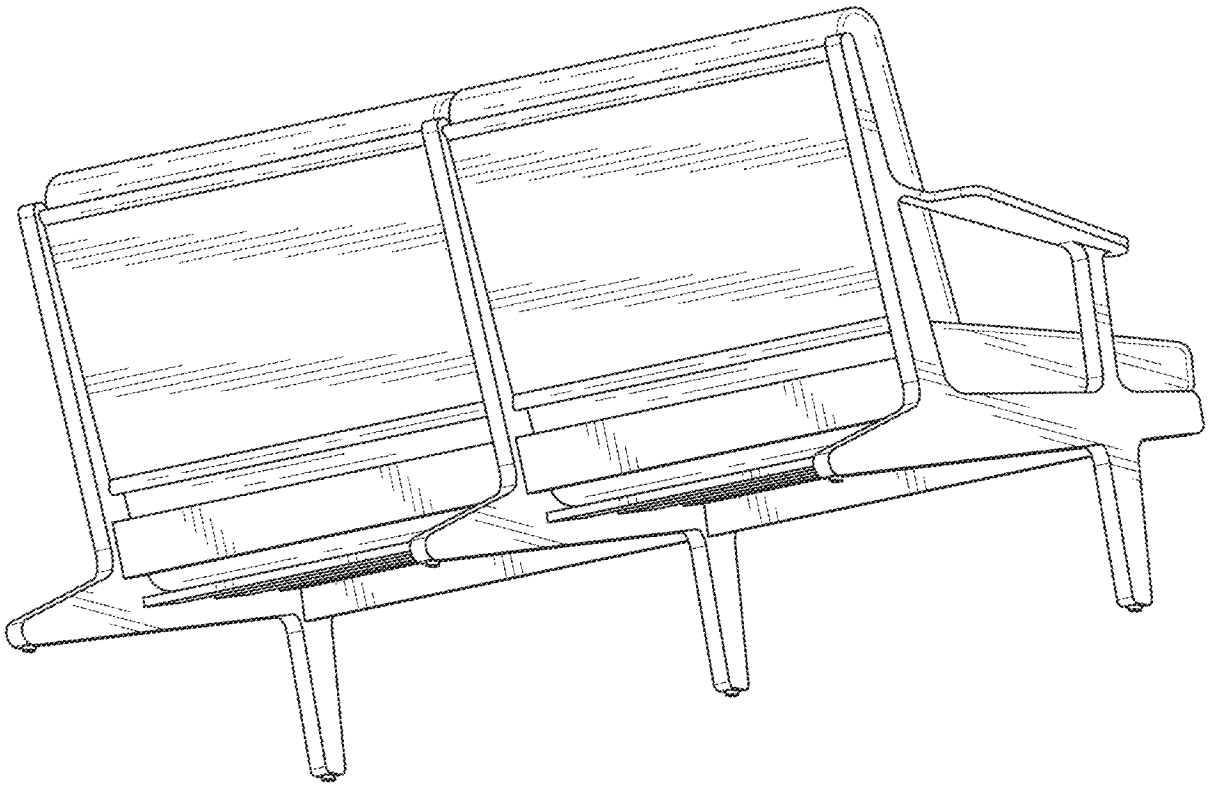
Figure 11:
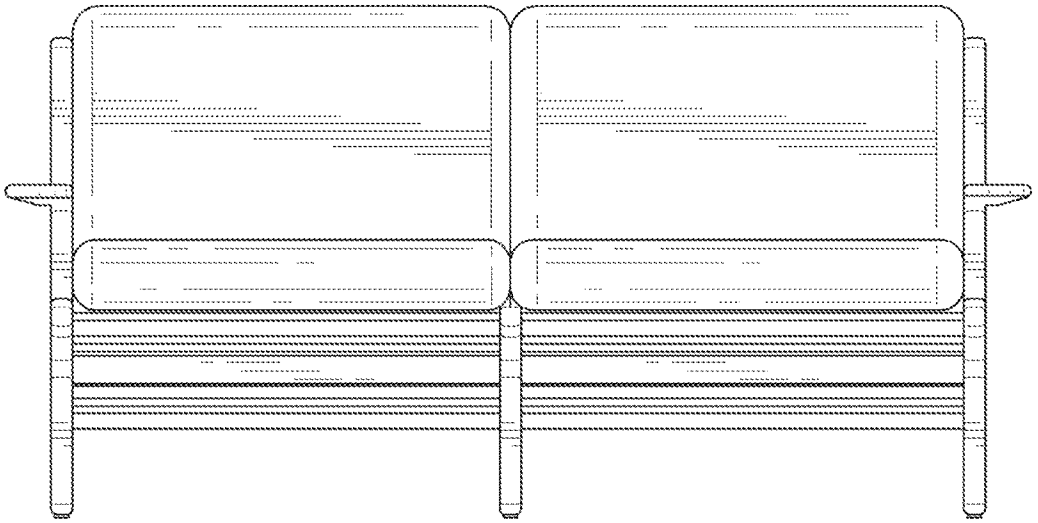
Figure 12:
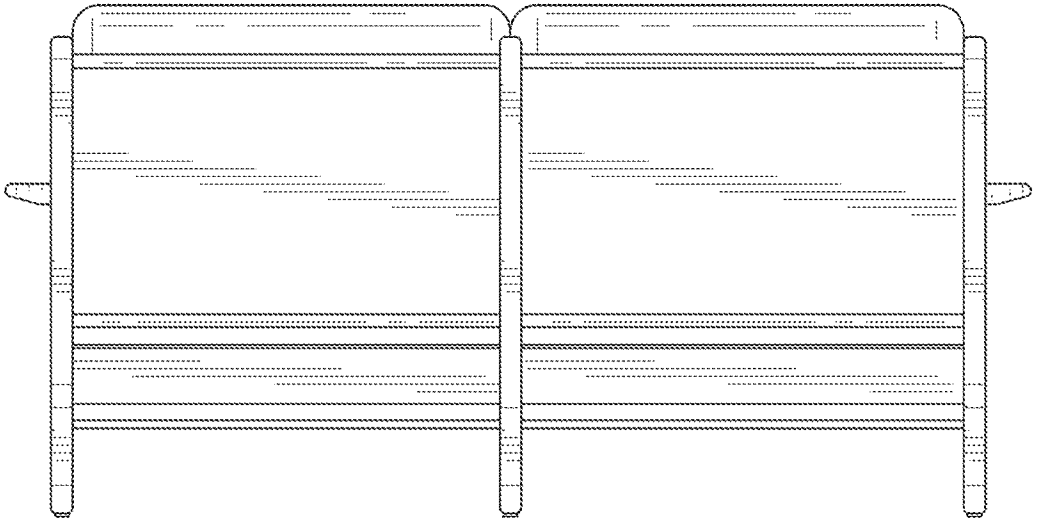
Figure 13:
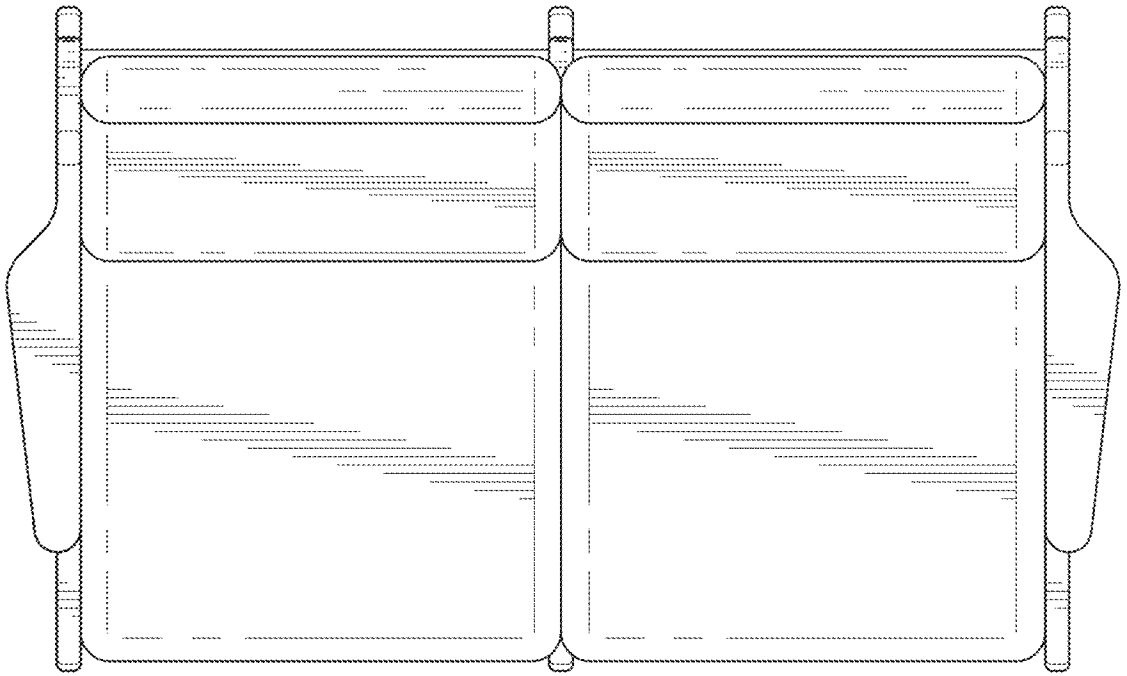
Figure 14:
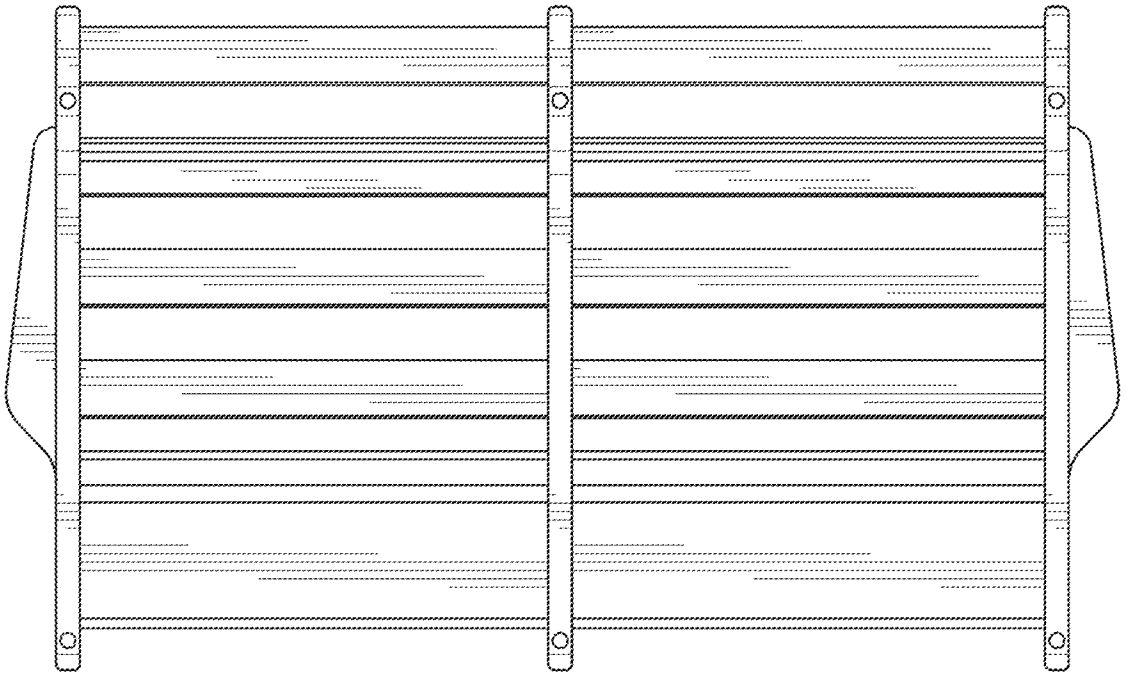
Figure 16:
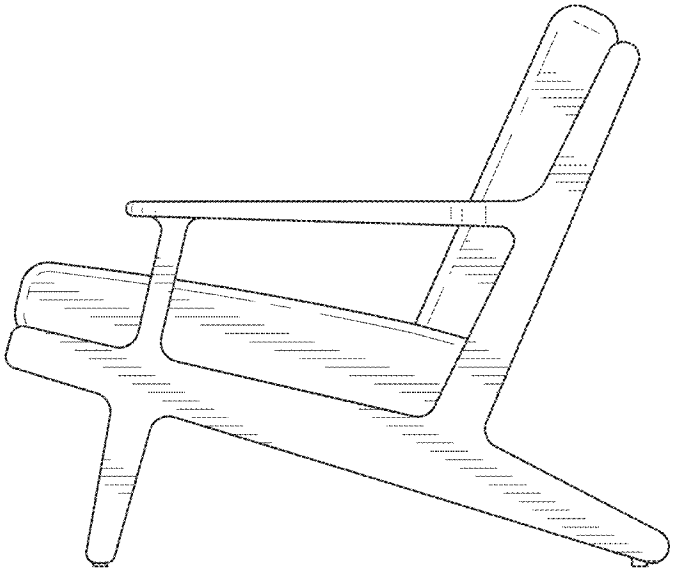
Figure 15:
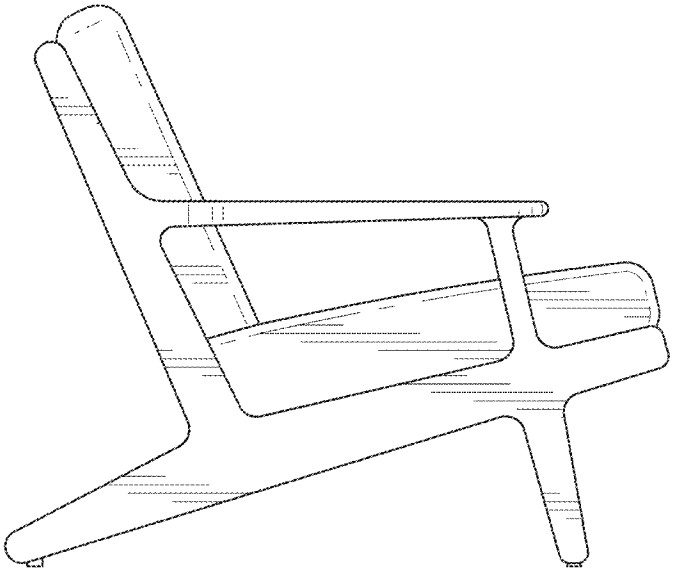
Figure 17:
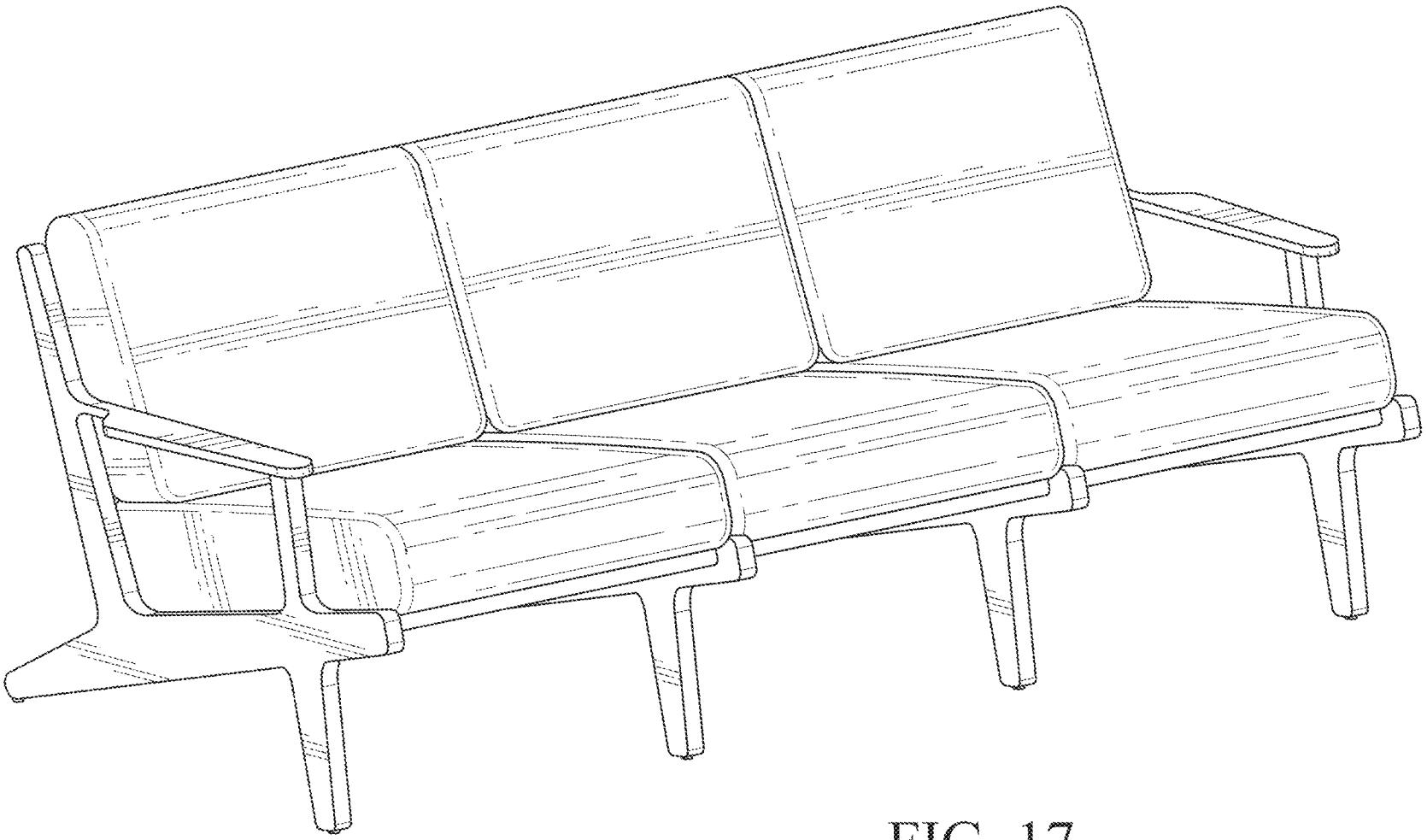
Figure 18:
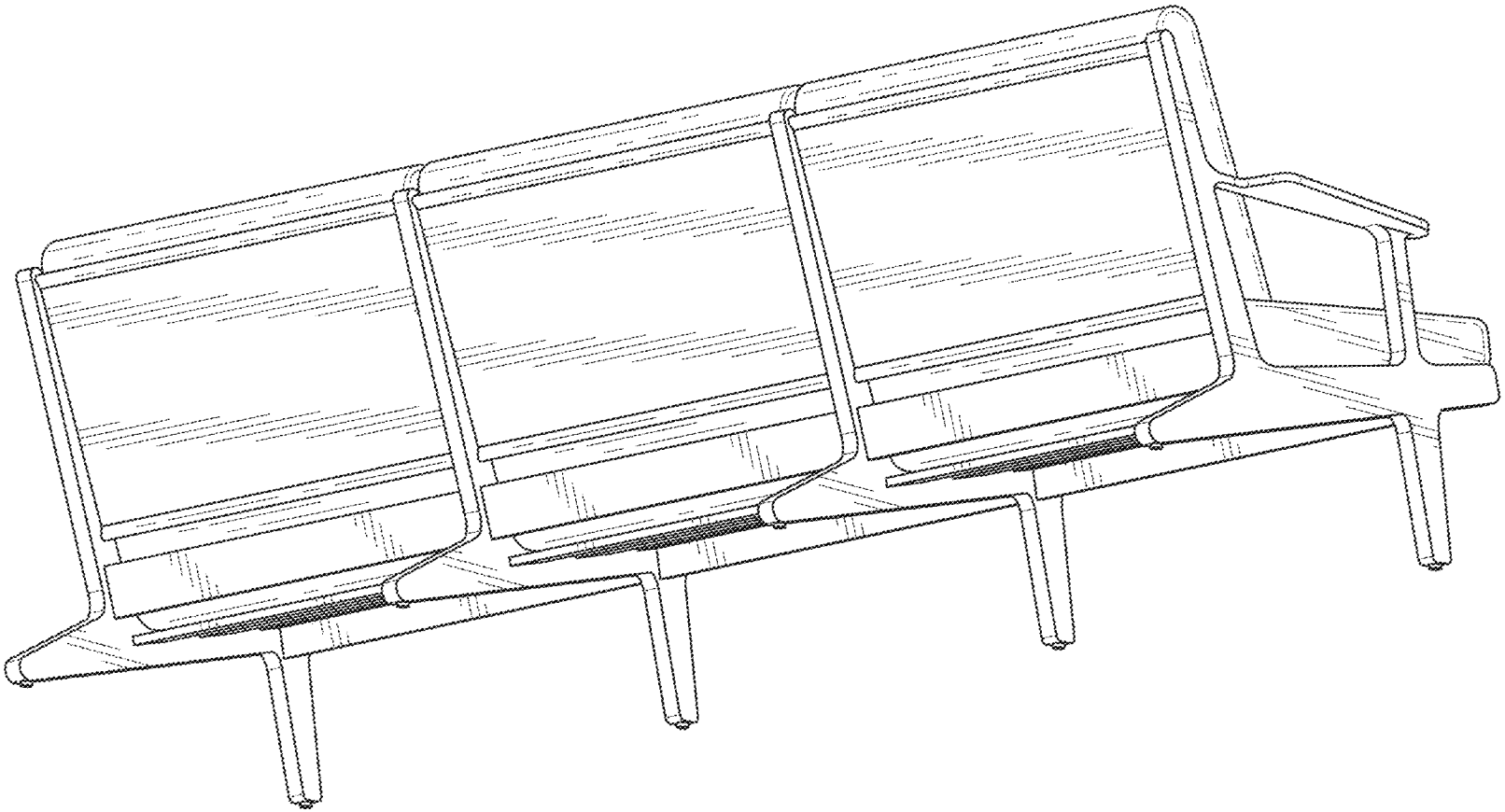
Figure 19:
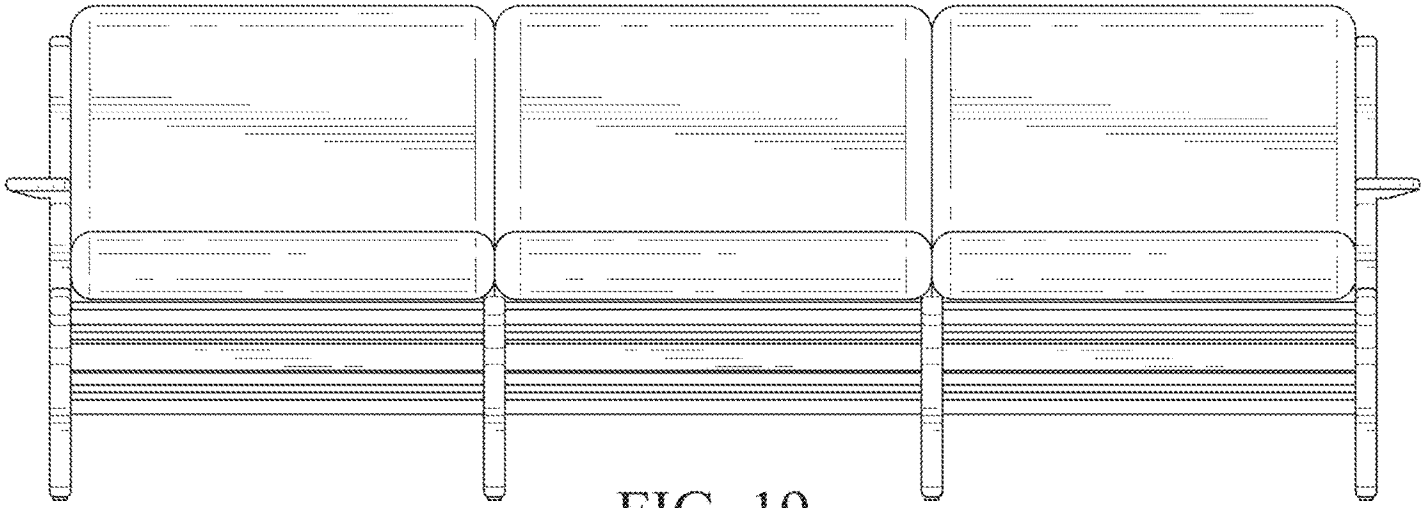
Figure 20:
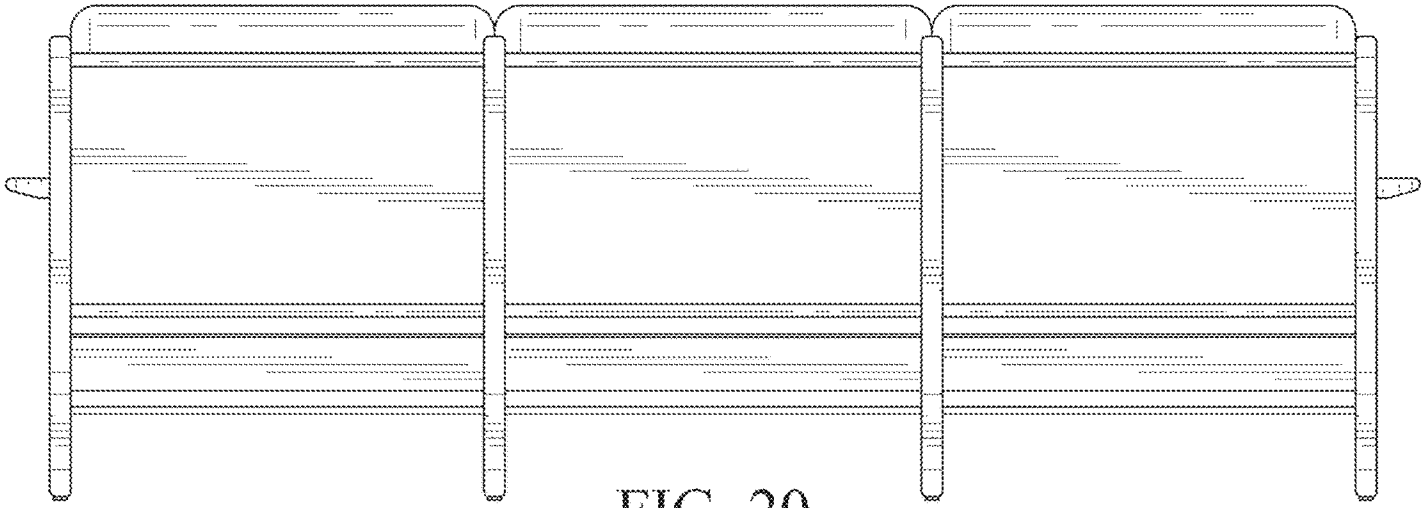
Figure 21:
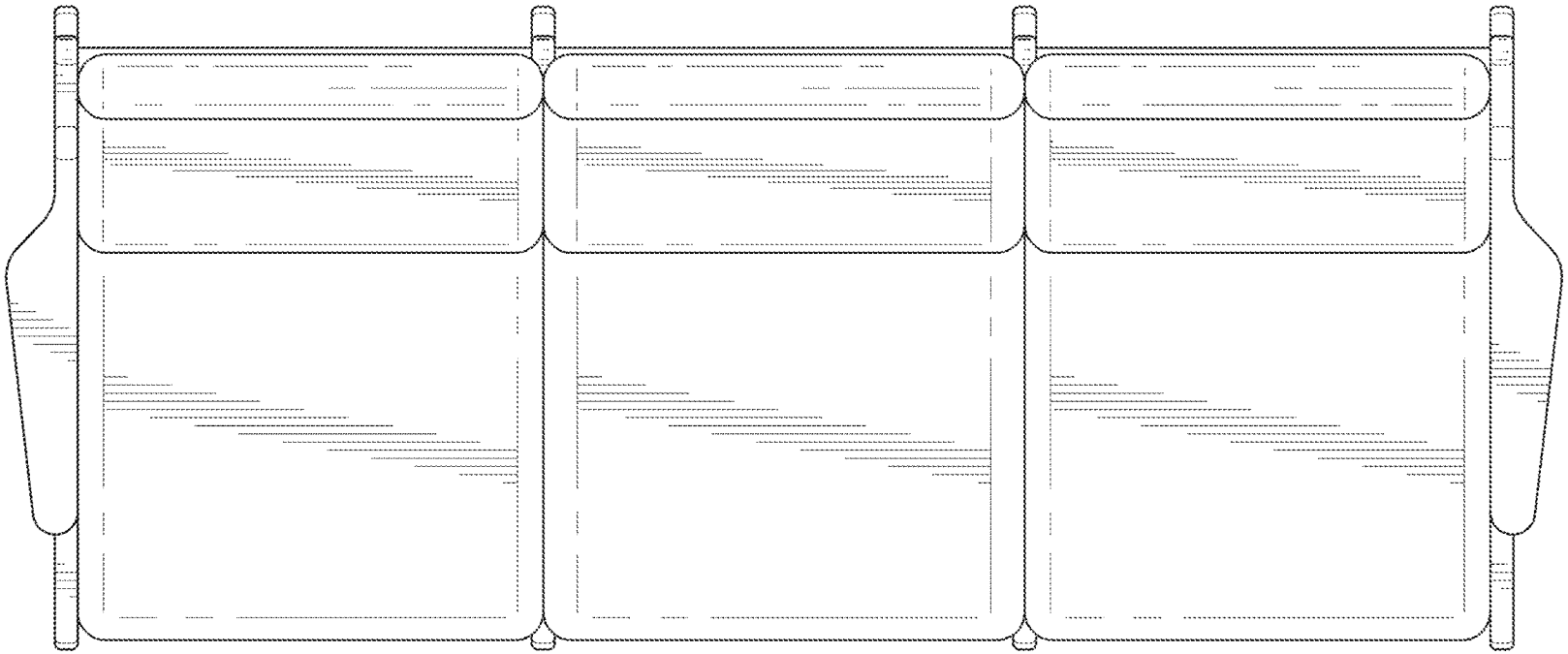
Figure 22:
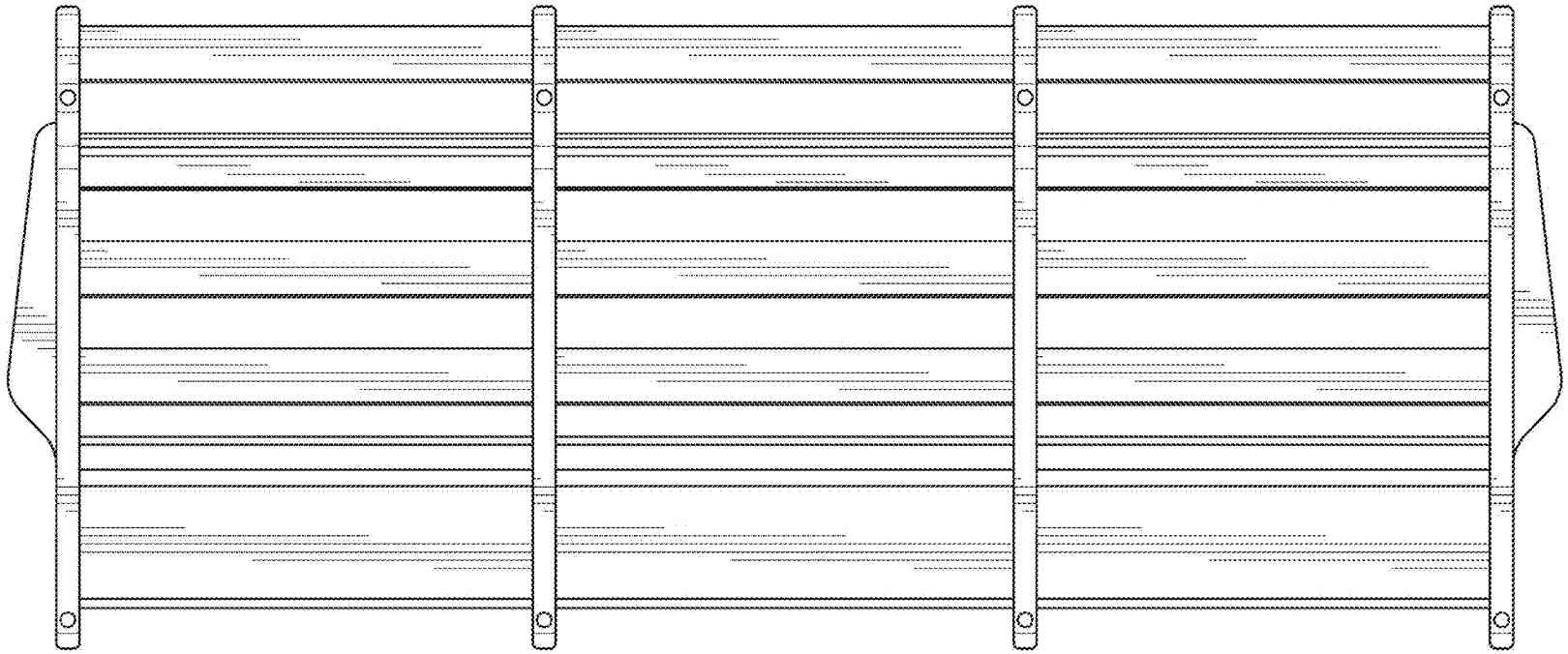
Figure 24:
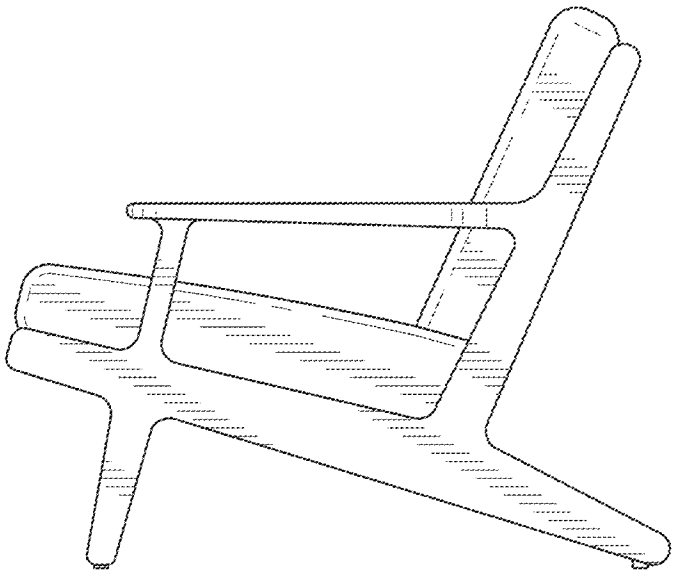
Figure 23:
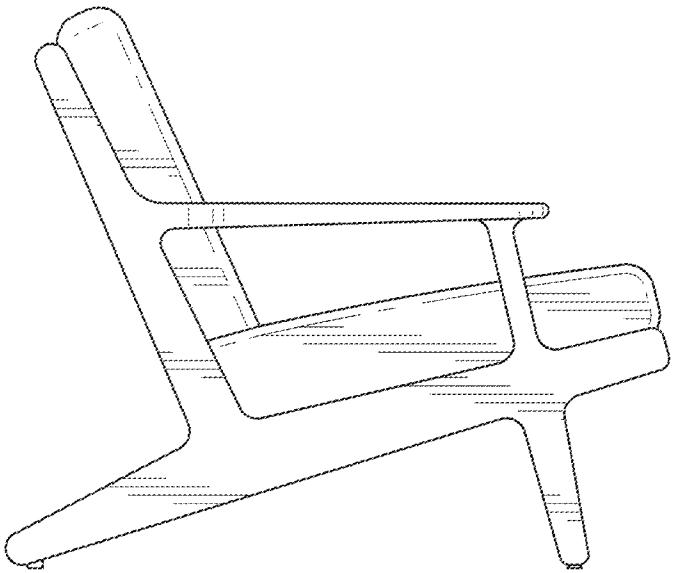

Matter enclosed in heavy brackets [ ] appears in the original patent but forms no part of this reissue; matter printed in italics indicates the additions made by reissue.

(58) Field of Classification Search
CPC .... A47C 7/00; A47C 7/62; A47C 7/18; A47C 7/54; A47C 4/00; A47C 4/028; A47C 4/28; A47C 3/16; A47C 3/04; A47C 3/12; A47C 1/02; A47C 1/14

See application file for complete search history.

(56) References Cited

U.S. PATENT DOCUMENTS

| | | | | | |
|---|---|---|---|---|---|
| D165,788 | S | * | 1/1952 | Risom | D6/379 |
| 2,587,881 | A | * | 3/1952 | Oakes | A47C 4/02 297/327 |
| D171,521 | S | * | 2/1954 | Taffae | D6/334 |
| D177,081 | S | * | 3/1956 | Wells | D6/334 |
| D177,366 | S | * | 4/1956 | Cutrow | D6/375 |
| D182,901 | S | * | 5/1958 | Kaehn | D6/374 |
| D183,618 | S | * | 9/1958 | Kofod-Larsen | D6/379 |
| D187,424 | S | * | 3/1960 | Frank | D6/335 |
| D193,842 | S | * | 10/1962 | Ohlsson | D6/379 |
| D193,843 | S | * | 10/1962 | Ohlsson | D6/379 |
| D193,844 | S | * | 10/1962 | Ohlsson | D6/379 |
| D267,057 | S | * | 11/1982 | Koehm | D6/368 |
| D282,800 | S | * | 3/1986 | Sorensen | D6/334 |
| D293,842 | S | * | 1/1988 | Titi | D32/73 |
| D440,422 | S | * | 4/2001 | DeJule | D6/371 |
| D635,788 | S | * | 4/2011 | Schwamkrug | D6/371 |
| D690,952 | S | * | 10/2013 | Becker | D6/374 |
| D767,295 | S | * | 9/2016 | Haase | D6/374 |

* cited by examiner

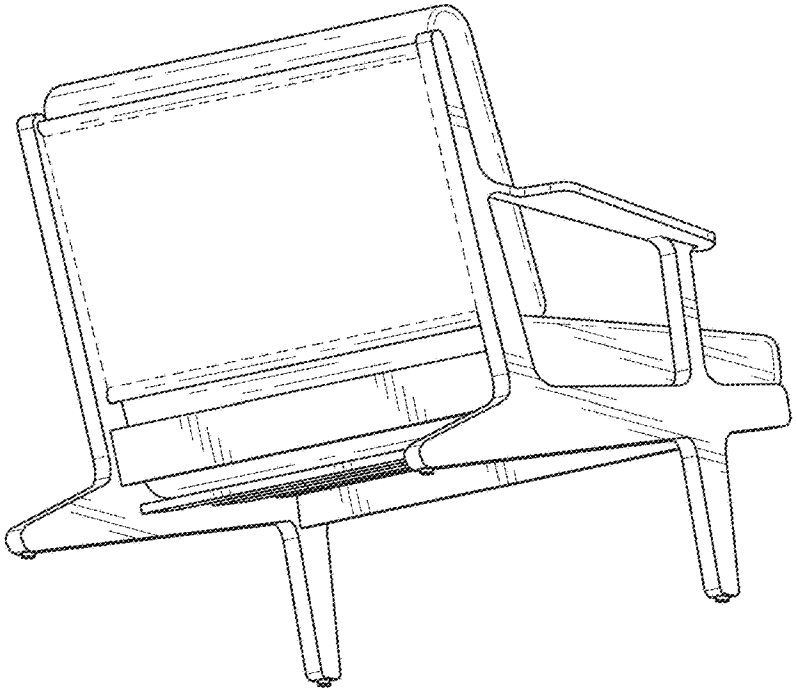
FIG. 26 NEW
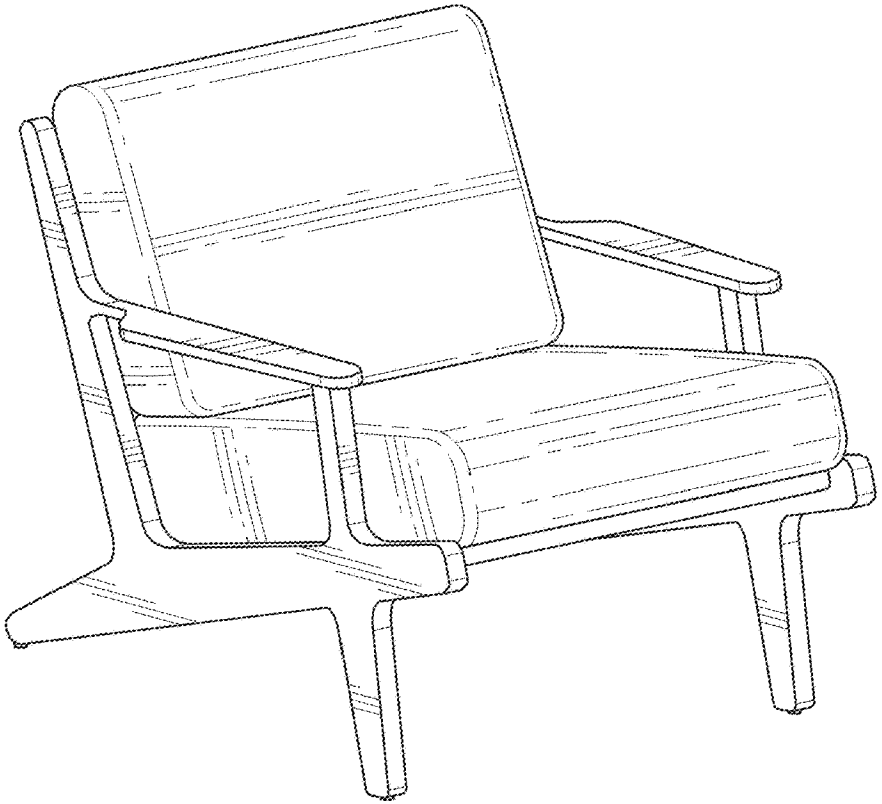
FIG. 25 NEW

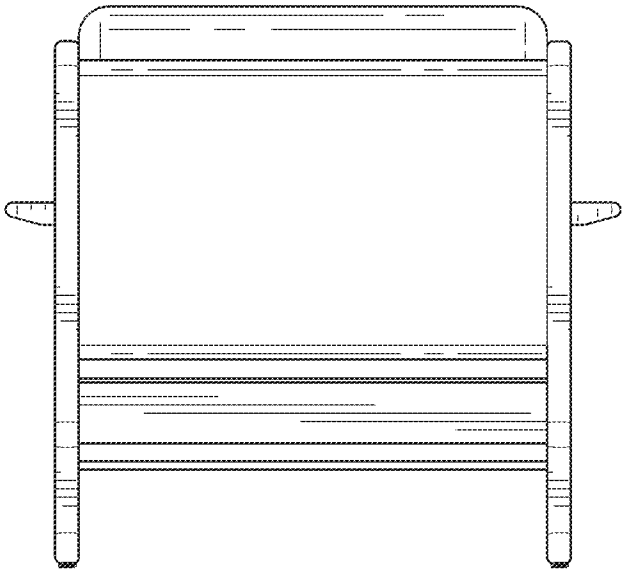
FIG. 28 NEW
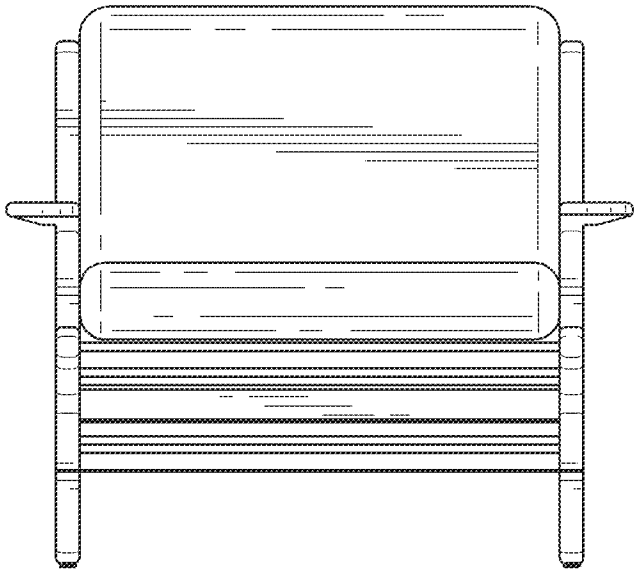
FIG. 27 NEW

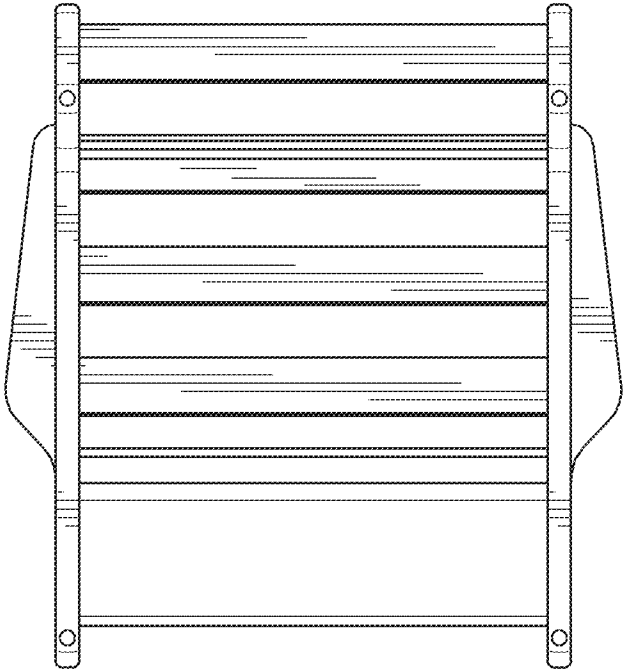
FIG. 30 NEW
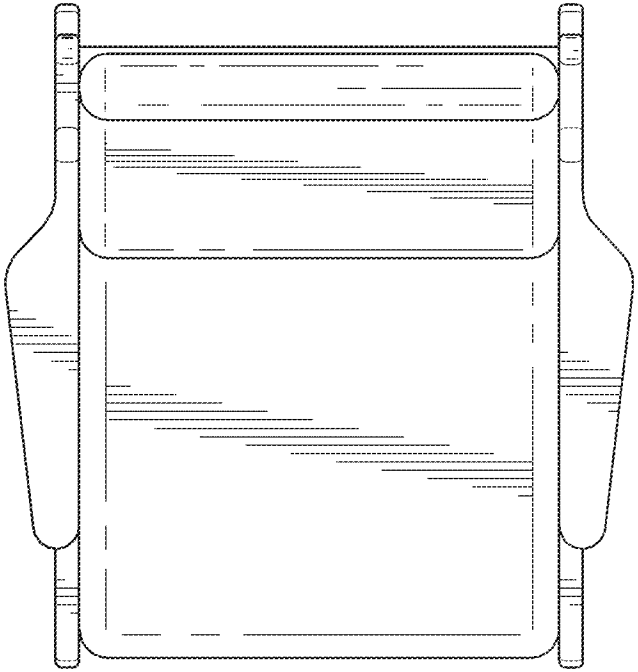
FIG. 29 NEW

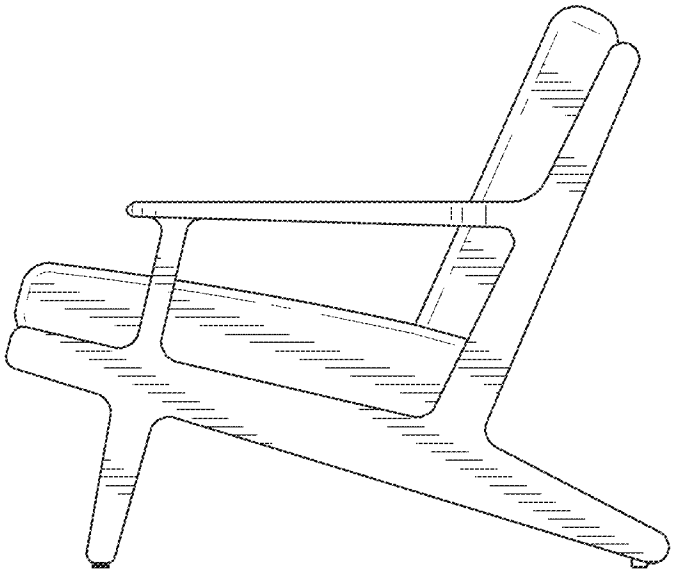
FIG. 32 NEW
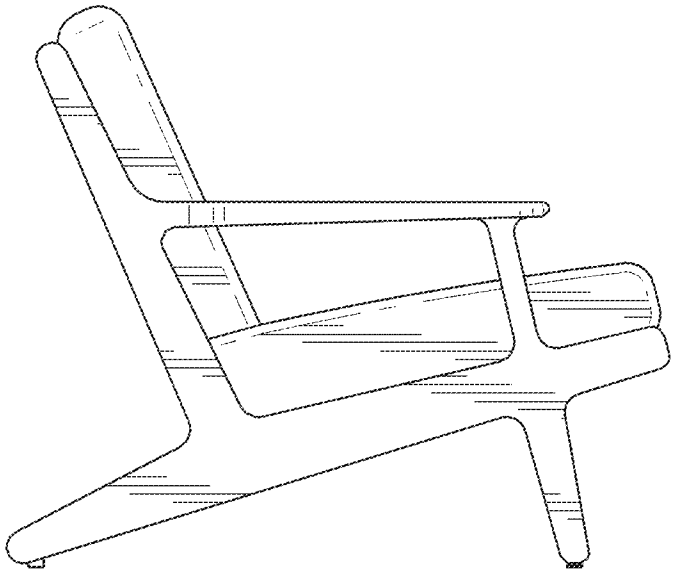
FIG. 31 NEW

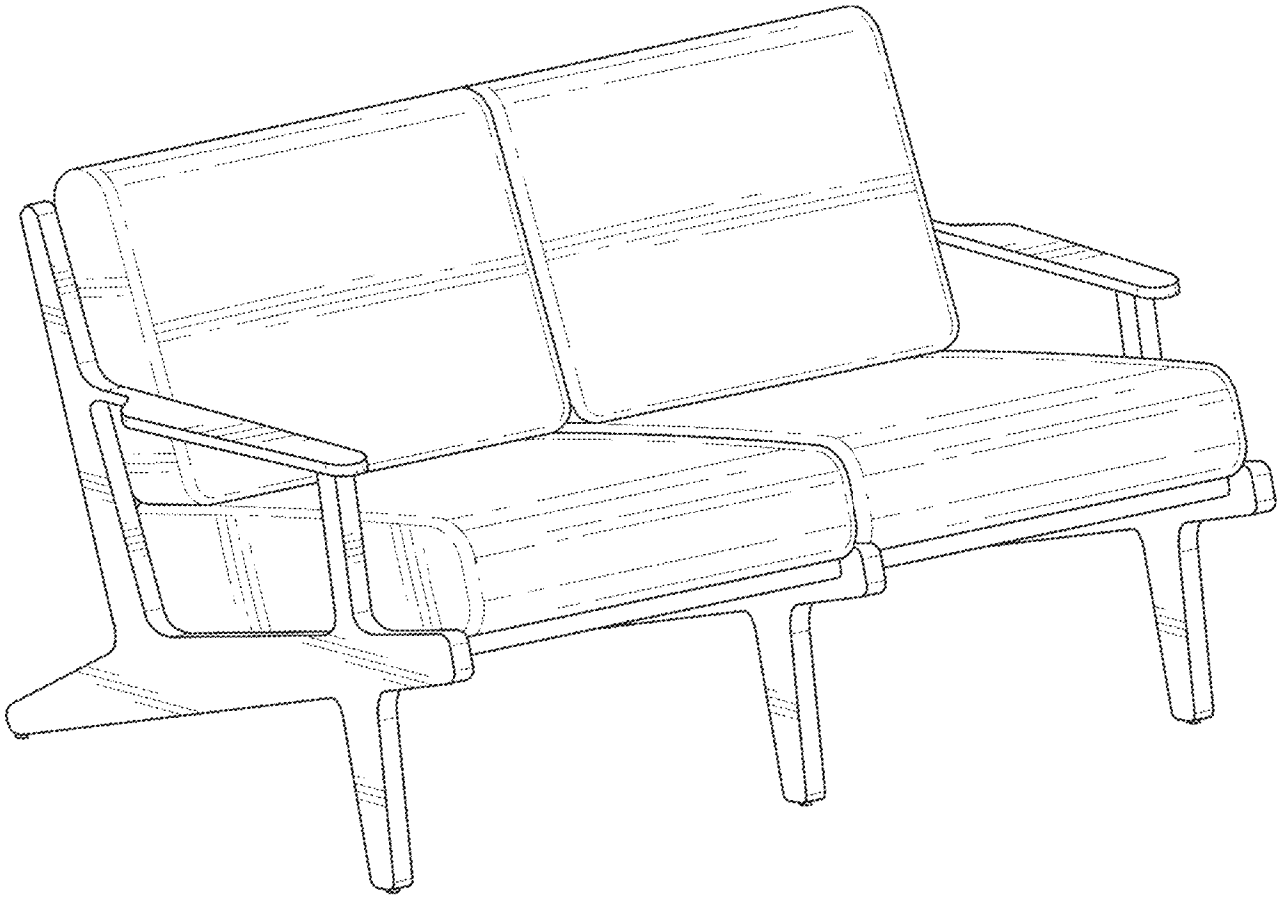
FIG. 33 NEW

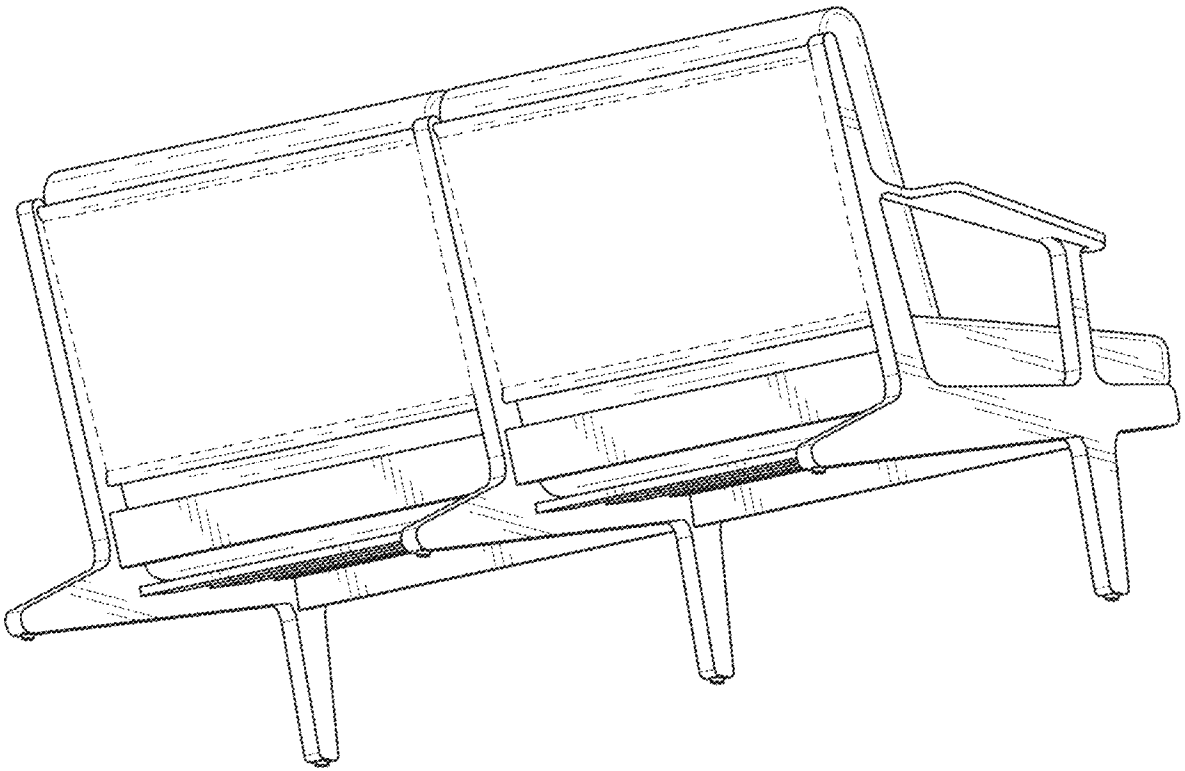
FIG. 34 NEW

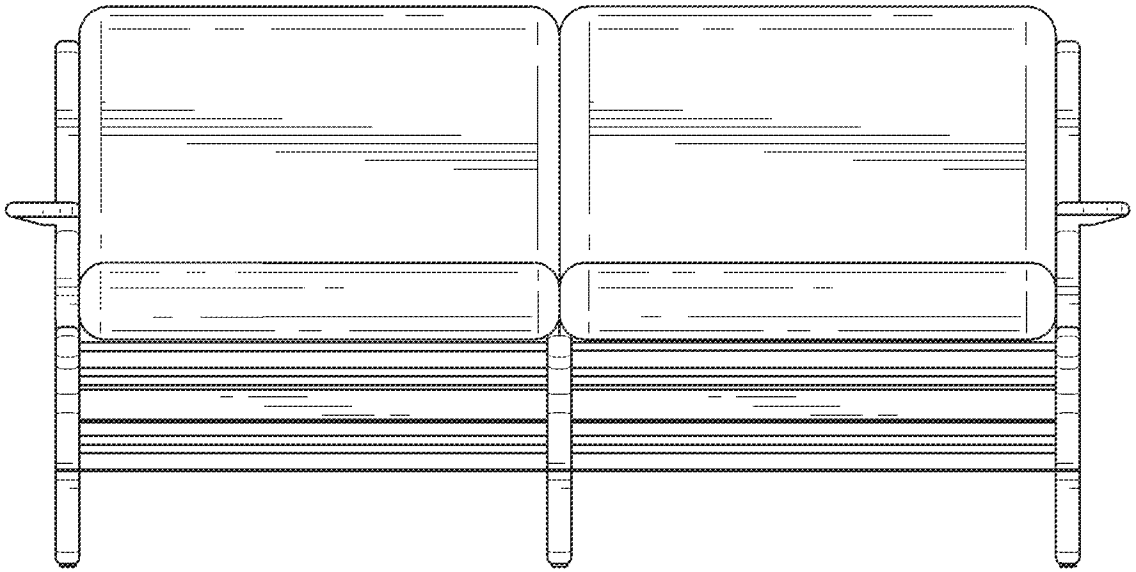
FIG. 35
NEW
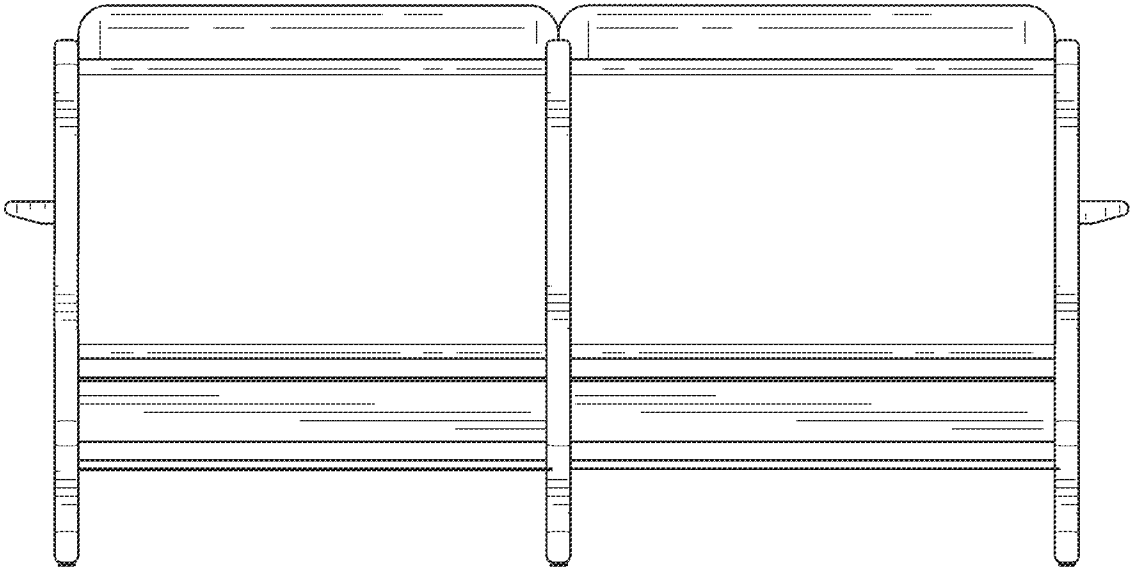
FIG. 36
NEW

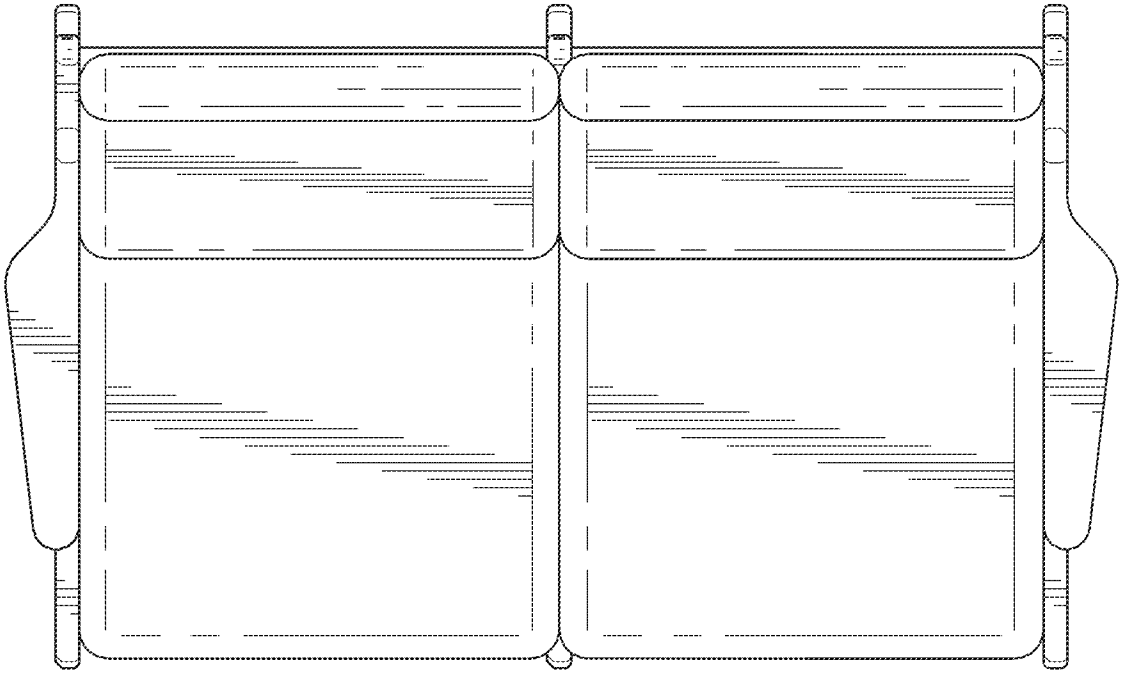
FIG. 37 NEW

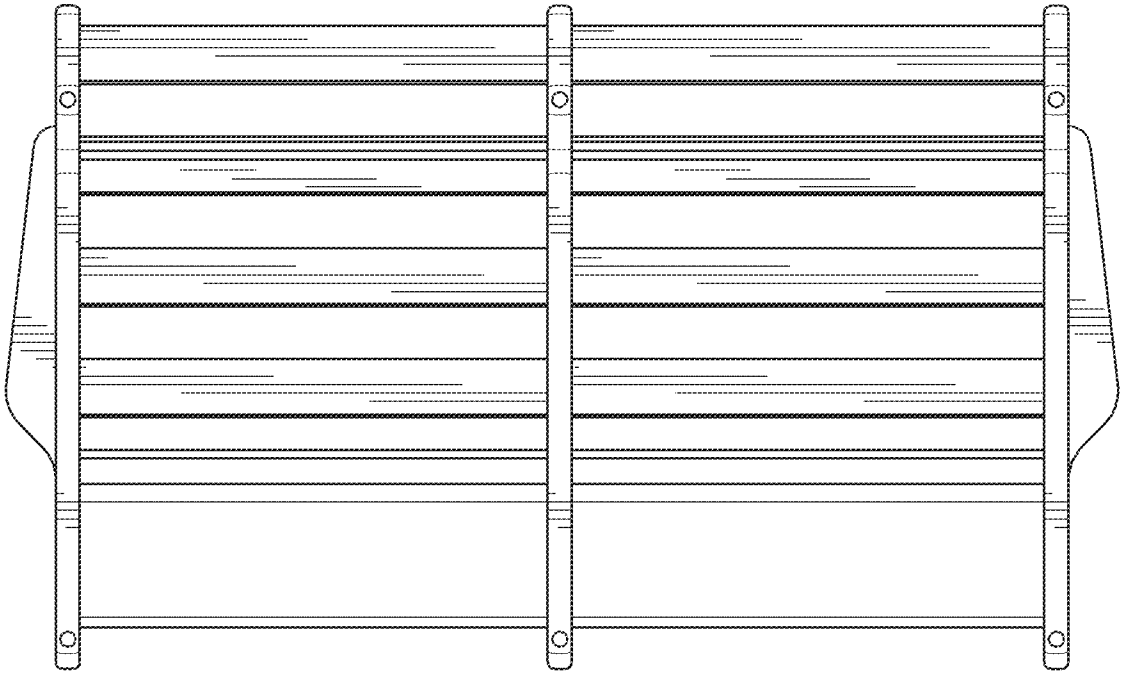
FIG. 38 NEW

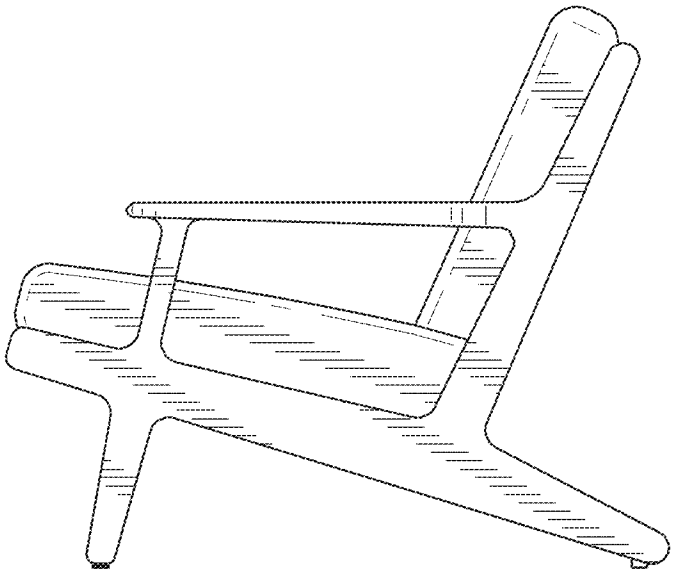
FIG. 40 NEW
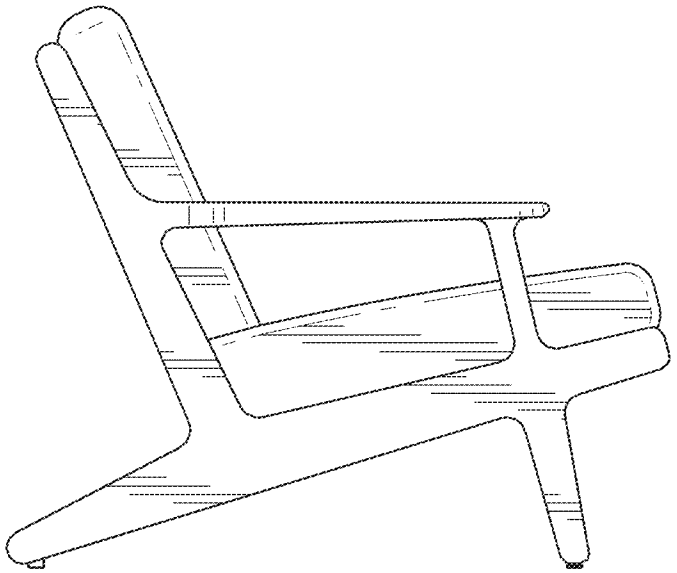
FIG. 39 NEW

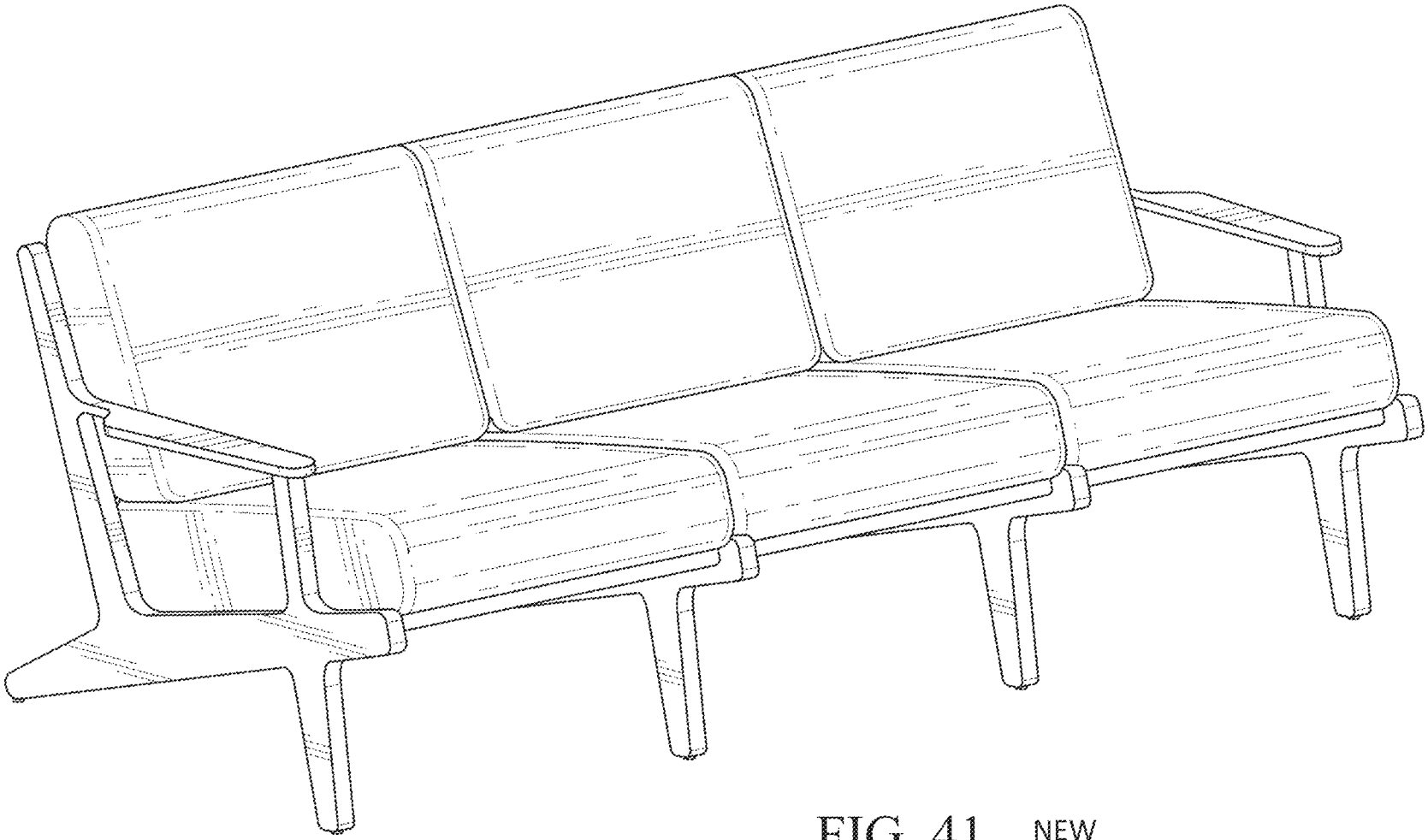
FIG. 41 NEW

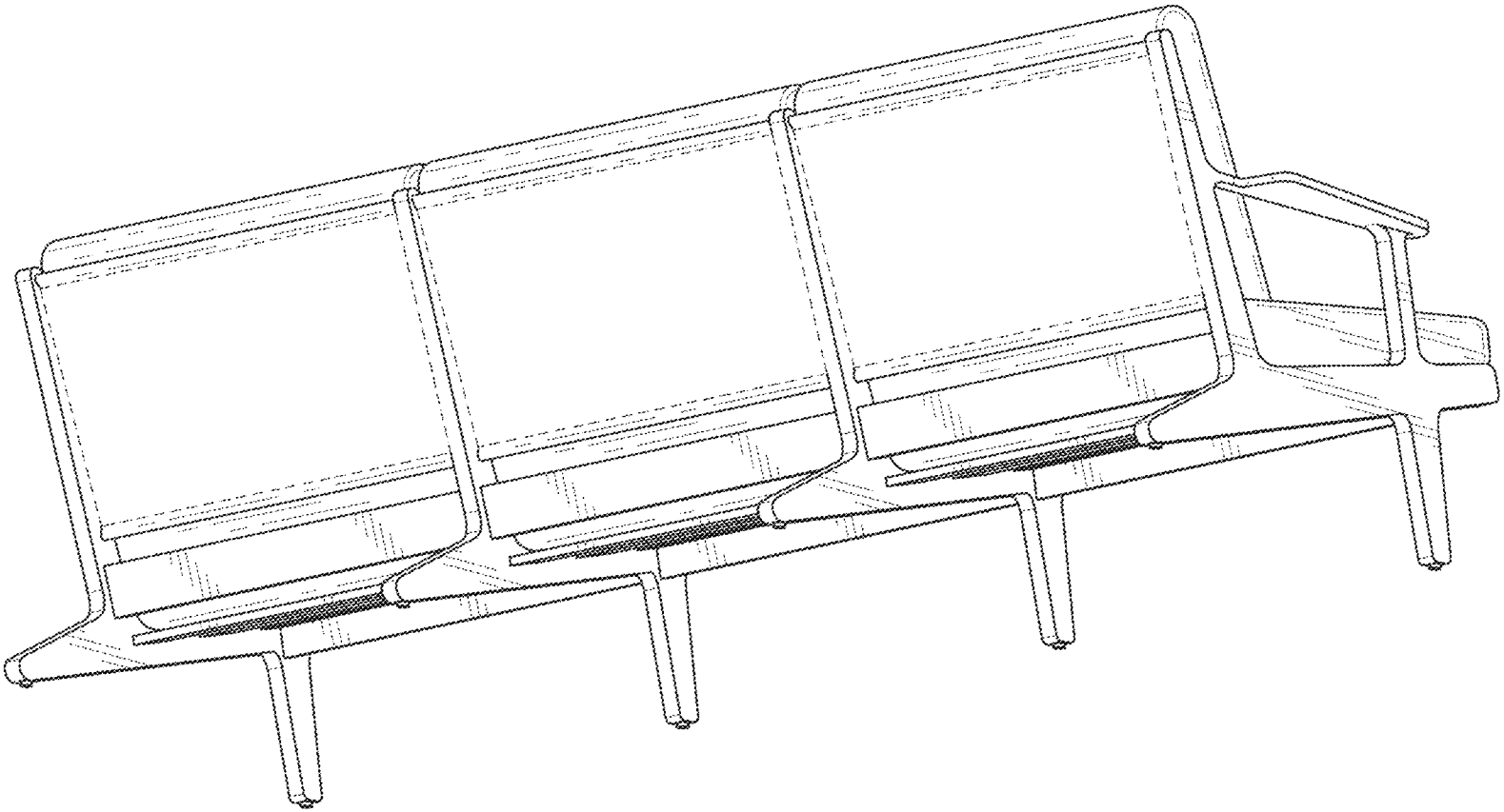
FIG. 42 NEW

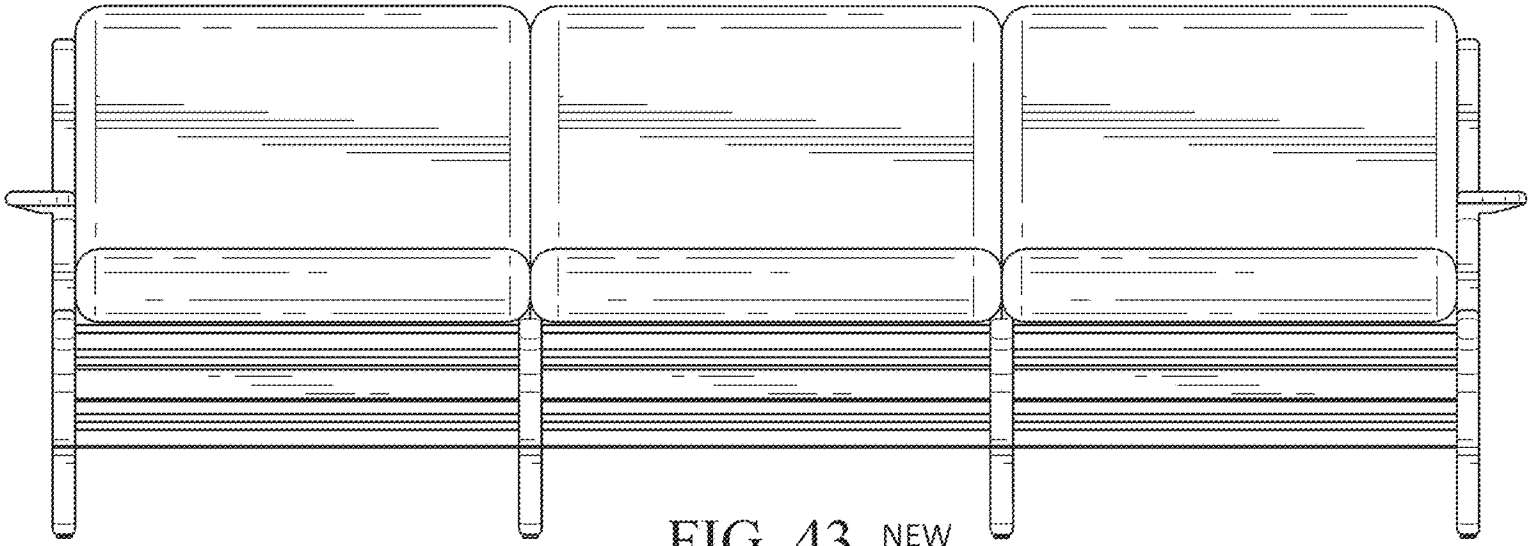
FIG. 43 NEW
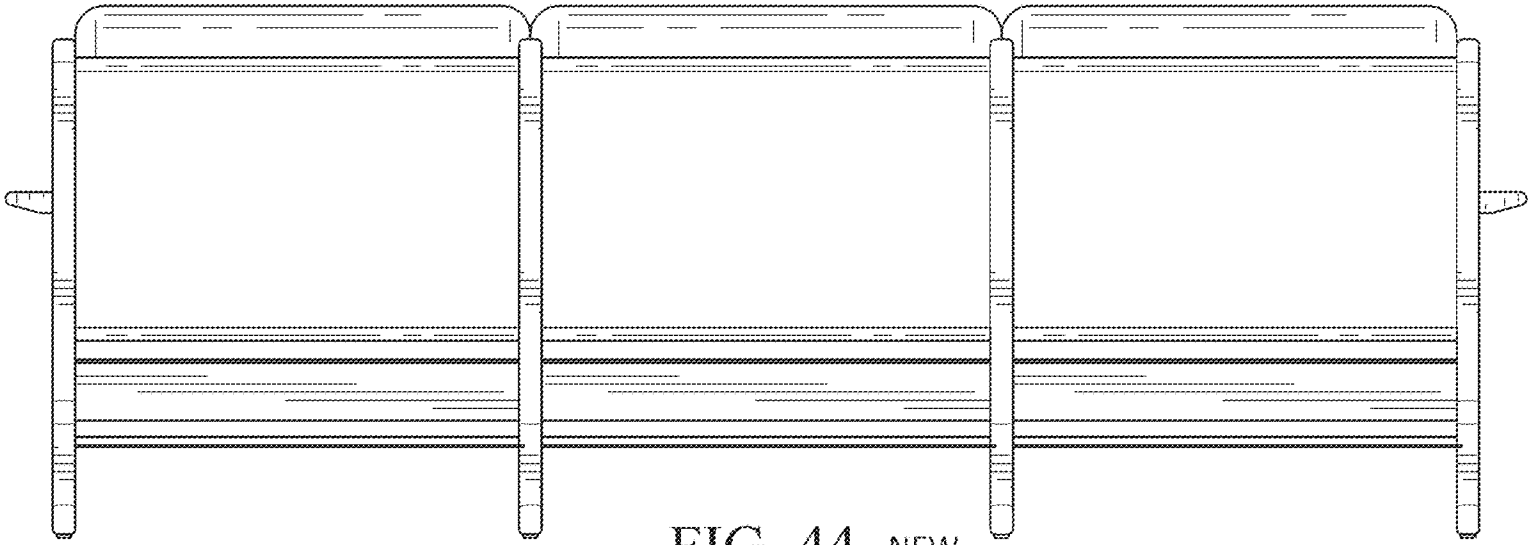
FIG. 44 NEW

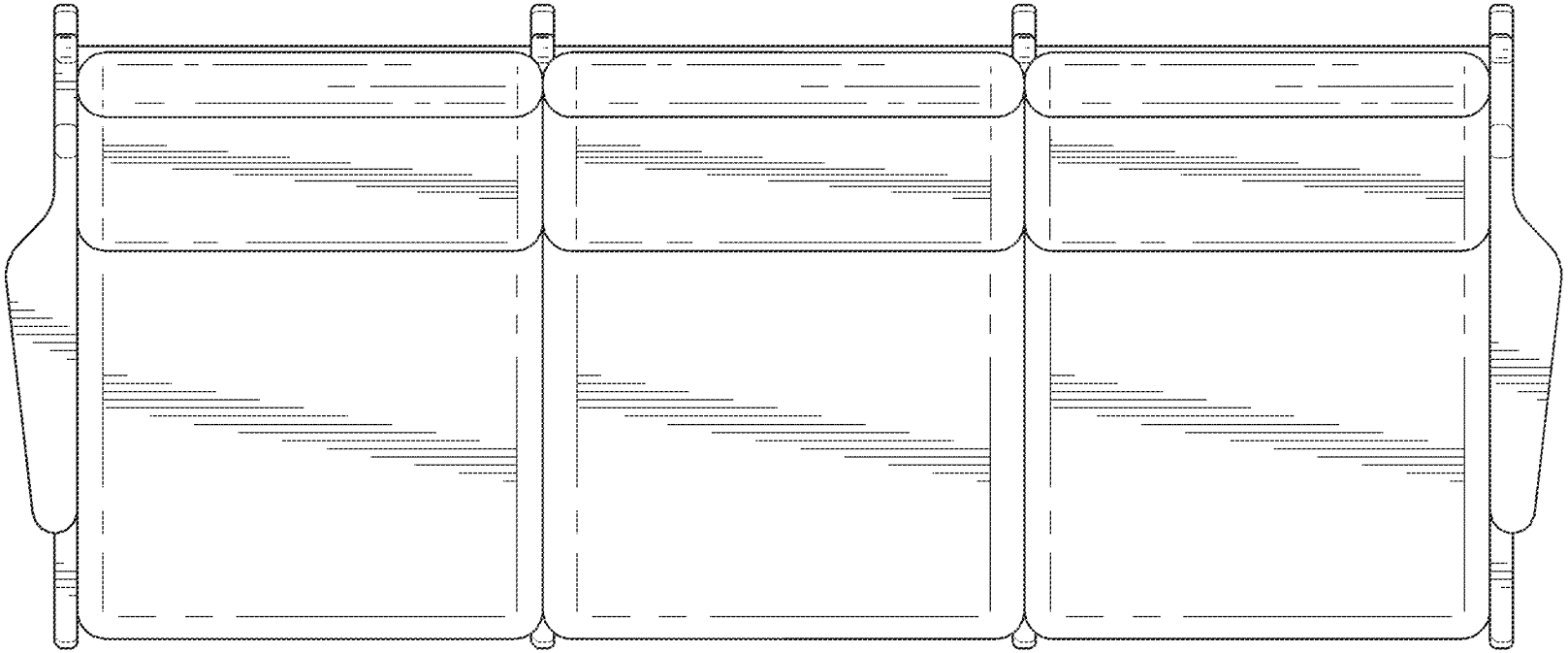
FIG. 45 NEW

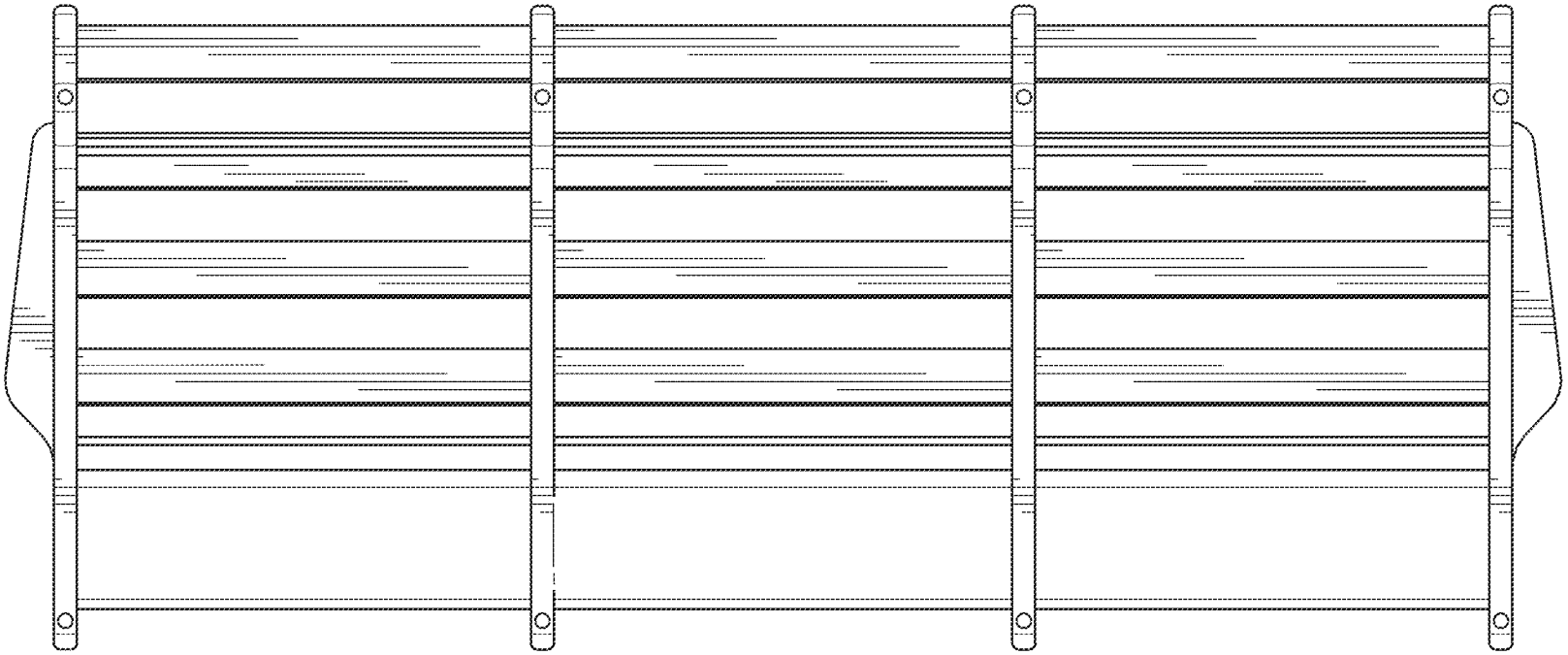
FIG. 46 NEW

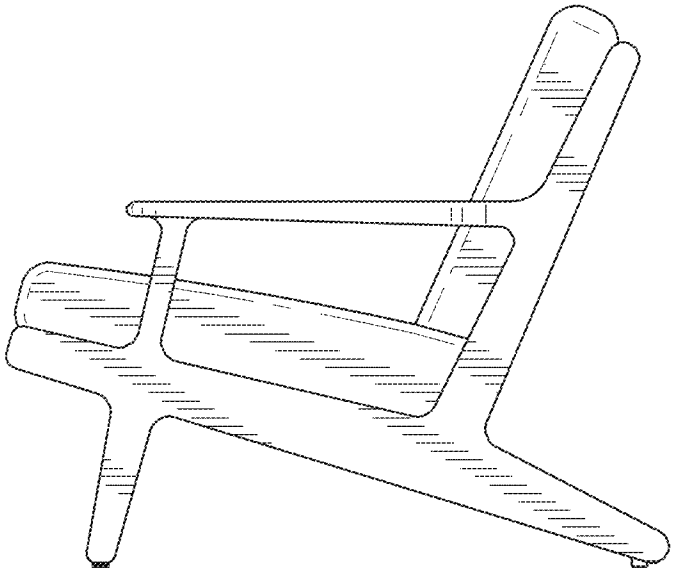
FIG. 48 NEW
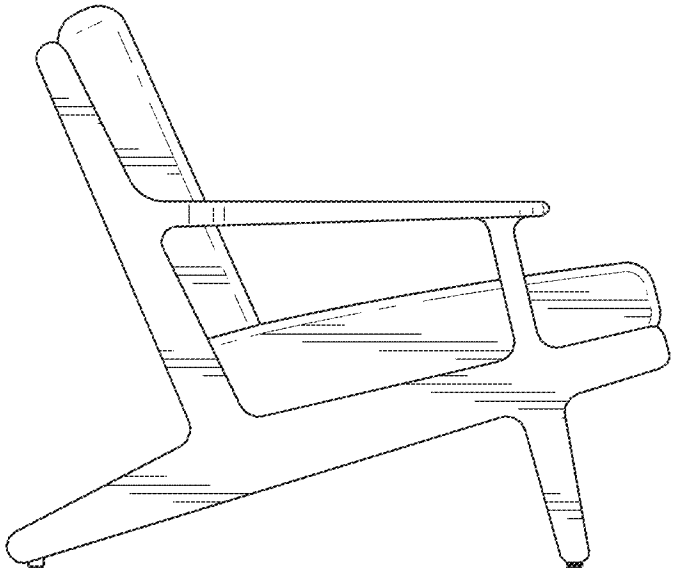
FIG. 47 NEW